Jan. 7, 1947.  E. F. HUFFSMITH  2,413,919
CHAIN SAW FILING BENCH
Filed June 1, 1945
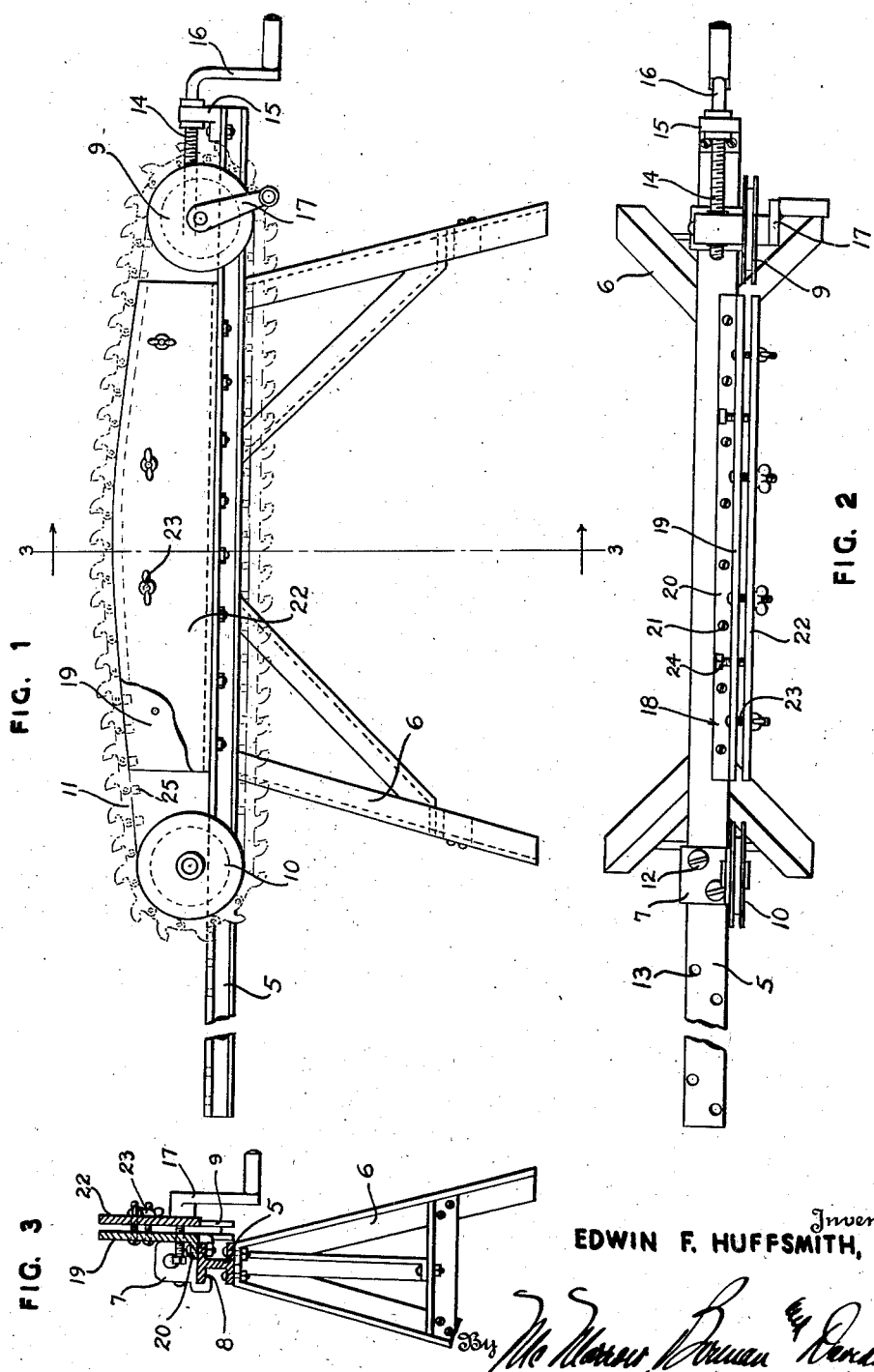
EDWIN F. HUFFSMITH, Inventor Patented Jan. 7, 1947

2,413,919

UNITED STATES PATENT OFFICE 2,413,919

CHAIN SAW FILING BENCH

Edwin Franklin Huffsmith, Cook, Wash.

Application June 1, 1945, Serial No. 597,079

2 Claims. (Cl. 76—78)

The present invention relates to new and useful improvements in chain saw filing benches adapted for supporting a chain saw in positioning while sharpening the same.

An important object of the present invention is to provide a supporting bench for the chain saw embodying adjustable clamping means for securing the upper flight of the saw stationary while the saw is being sharpened and embodying means for accommodating chain saws of various widths.

A further object of the invention is to provide a chain saw support of this character embodying pulleys over which the saw is adapted to travel to bring the successive teeth into sharpening position and also providing means for securing the pulleys in adjusted position on the bench relative to each other to accommodate saws of different lengths.

Another object is to provide an apparatus of this character of simple and practical construction, which is efficient and reliable in operation, strong and durable, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a side elevational view.

Figure 2 is a top plan view.

Figure 3 is a transverse sectional view taken substantially on a line 3—3 of Figure 1.

Referring now to the drawing in detail, wherein for the purpose of illustration I have disclosed a preferred embodiment of the invention, the numeral 5 designates an I-beam supported in a horizontal position on legs 6.

A pair of pulley-supporting blocks 7 are formed with channels 8 on the under sides thereof slidably mounted on the upper flange of the I-beam 5, the blocks having pulleys 9 and 10 journaled thereon and adapted for supporting a chain saw 11 of conventional construction for traveling on the pulleys.

One of the blocks 7 for the pulley 10 is secured in longitudinally adjusted position on the I-beam 5 by means of pins 12 adapted for entering openings 13 in the upper flange of the I-beam, while the block for the pulley 9 is adjustable longitudinally on the I-beam by means of a screw 14 threaded through the block and journaled in a bracket 15 secured at the adjacent end of the I-beam. The screw is operated by means of a crank handle 16 attached at the outer end of the screw.

The pulley 9 is also provided with a crank handle 17 for rotating the pulley to cause the saw to travel thereon.

A clamping member designated generally at 18 is provided for supporting the upper flight of the saw in a stationary position, the clamping member including a longitudinally extending clamping plate 19 having a flange 20 at its lower edge seated on the top of the I-beam 5 and secured thereto by bolts or the like 21.

A movable clamping plate 22 is secured to one side of the clamping plate 19 by bolts and wing nuts or the like 23, the clamping plate being maintained in spaced parallel relation by means of set screws 24 carried by the clamping plate 19.

The clamping plates 19 and 22 are secured in spaced-apart relation in order to receive the guides 25 of the saw therebetween and with the upper flight of the saw resting on the upper edges of the plates 19 and 22, as shown to advantage in Figure 1 of the drawing.

The clamping plate 22 may be adjusted to accommodate saws of various widths and the pulley 10 may be adjusted longitudinally on the I-beam 5 to accommodate saws of various lengths.

Slack in the saw is taken up by the adjustment of the screw 14.

In the operation of the device, the saw is placed in position on the pulleys 9 and 10 and the pulleys adjusted on the I-beam 5 to take up slack in the saw and the upper flight of the saw is then secured against movement by the saw clamp 18, whereby the teeth of the saw may then be filed and sharpened.

Successive teeth are brought into position on top of the saw clamp 18 by rotating the pulley 9 by the handle 17.

It is believed that the details of construction, manner of use and advantages of the device will be readily understood from the foregoing without further detailed explanation.

It is to be understood, however, that even though I have herein shown and described a preferred embodiment of my invention, the same is susceptible of certain changes fully comprehended by the spirit of the invention as herein described, and the scope of the appended claims.

Having thus described the invention, what I claim is:

1. A device as described consisting of a longitudinal metal sill, an under structure supporting said sill in elevated position horizontally, an elongated upright channeled guide member having a right angular base flange secured marginally upon said longitudinal sill so it flanks the adjacent side of said sill, a fixed block surmounting said sill and journaling a pulley sheave whose peripheral groove is in longitudinal alignment with the channel in said guide member opposite one end thereof, a slidable block surmounting said sill opposite the other end of said guide member, means at the end of said sill for adjusting the position of said slidable block, a second pulley sheave journaled in the slidable block whose peripheral groove is also in longitudinal alignment with said channel of said guide member, and a hand crank on the last-named pulley disposed laterally of said sill.

2. In combination a standard, a horizontally extending rigid longitudinal sill surmounting the same, a pair of longitudinally aligned and separated blocks slidably surmounting the top web of said sill, said sill having at one end longitudinally separated holes, fasteners anchoring one of said blocks rigidly and adjustably of the length of said sill, being secured in any of said holes, a bracket fixed at the other end of said sill, a screw rotatingly mounted in said bracket engaged with said other block to reciprocate it adjustably, a hand crank on said screw, a pair of grooved pulleys journaled in said blocks in longitudinal alignment opposite one side of said sill, and a chain saw stretch guiding member providing on its top surface a channel in longitudinal alignment with the grooved pulleys, said guiding member being interposed securely on said sill between said pulleys.

EDWIN FRANKLIN HUFFSMITH.